United States Patent
Singh et al.

(10) Patent No.: US 9,069,578 B2
(45) Date of Patent: Jun. 30, 2015

(54) DYNAMIC USER INTERFACE ELEMENTS

(75) Inventors: Durga Deepthi Ramesh Singh, Haryana (IN); Sreedhar Ranganathan, Tamil Nadu (IN); Jamie Myrold, Daly City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1106 days.

(21) Appl. No.: 13/034,925

(22) Filed: Feb. 25, 2011

(65) Prior Publication Data

US 2011/0214077 A1  Sep. 1, 2011

Related U.S. Application Data

(63) Continuation of application No. 11/903,467, filed on Sep. 21, 2007, now Pat. No. 7,917,859.

(51) Int. Cl.
*G06F 9/44* (2006.01)

(52) U.S. Cl.
CPC .................................. *G06F 9/4443* (2013.01)

(58) Field of Classification Search
CPC .............................. G06F 3/0486; G06F 3/0488
USPC .......................... 715/740, 738, 835, 810, 736
See application file for complete search history.

(56) References Cited

U.S. PATENT DOCUMENTS

| | | | |
|---|---|---|---|
| 2002/0159641 A1* | 10/2002 | Whitney et al. | 382/219 |
| 2006/0184880 A1* | 8/2006 | Bala | 715/705 |
| 2007/0118813 A1* | 5/2007 | Forstall et al. | 715/805 |

* cited by examiner

*Primary Examiner* — Kevin Nguyen
(74) *Attorney, Agent, or Firm* — Kilpatrick Townsend & Stockton LLP

(57) ABSTRACT

A set of rules and a current context for a user is obtained. The set of rules and the current context are used to determine a rule weight for each of a set of user interface elements. One or more of the user interface elements is caused to be displayed. Which user interface elements are displayed is based at least in part on the rule weights.

27 Claims, 7 Drawing Sheets

| Rule | Rank Parameters | | | | | | | Dynamic Parameters | |
|------|---|---|---|---|---|---|---|---|---|
| | Context Parameters | | | | UI Element | Accuracy (%) | Weight | Current Context | Rule Weight |
| | Location | Start Date | End Date | Age | | | | | |
| Christmas | All | Dec 15 | Jan 5 | All | Greeting Card | 80 | 2 | | |
| Chinese New Year in Korea | Korea | February 8, 2007 | February 20, 2007 | All | Greeting Card | 65 | 3 | | |
| Graduation | US | April 20 | May 30 | <20 | Photo Book | 80 | 1 | | |
| New Marketing Service | All | May 1, 2007 | July 1, 2007 | All | New Online Service | 100 | 8 | | |
| Hide Print Services in Japan | Japan | Any | Any | Any | US Only Print Service | 100 | -10 | | |

FIG. 3B

| UI Element | Sum | Net Weight | Rank |
|---|---|---|---|
| Greeting Card | 0+0 | 0 | 0 |
| US Only Print Service | 0 | 0 | 0 |
| New Online Service | 800 | 800 | 1 |
| Photo Book | 80 | 80 | 2 |

DYNAMIC USER INTERFACE ELEMENTS

CROSS REFERENCE TO OTHER APPLICATIONS

This application is a continuation of co-pending U.S. patent application Ser. No. 11/903,467, entitled DYNAMIC USER INTERFACE ELEMENTS filed Sep. 21, 2007 which is incorporated herein by reference for all purposes.

BACKGROUND OF THE INVENTION

In computer applications, a list of user interface (UI) elements accomplishing various functionality are often shown at the same place, for example the same window, menu, frame, tab, or pane. In typical applications, displays of UI elements are limited in their usefulness to various users. Therefore, improvements in the display of UI elements would be useful.

BRIEF DESCRIPTION OF THE DRAWINGS

Various embodiments of the invention are disclosed in the following detailed description and the accompanying drawings.

FIG. 3B is a sample a set of rules for a digital photo application.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
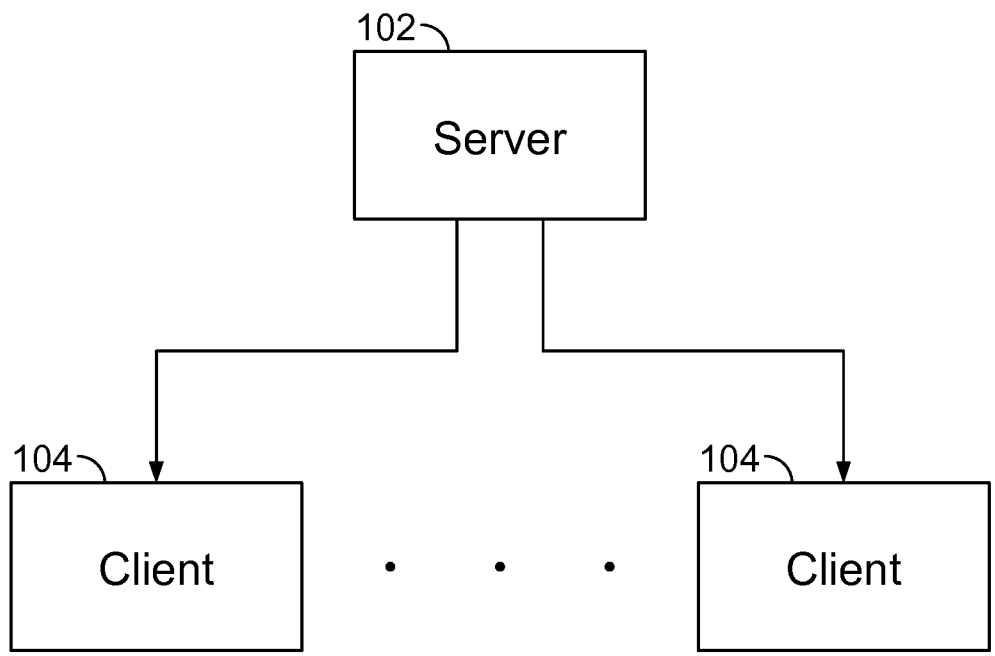
FIG. 1A is a block diagram illustrating an embodiment of a system for ranking UI elements in a dynamic manner.

FIG. 1A is a block diagram illustrating an embodiment of a system for ranking UI elements in a dynamic manner.

The space for displaying UI elements is often limited. In addition, the display of UI elements in a usable manner is desirable. As such, in some embodiments, which UI elements are displayed, and the order or rank in which the UI elements appear varies based on the importance of value of each UI element. The value of a UI element could be dependent on how important the application user assesses the UI element to be or how valuable or important the application designer assesses the UI element to be. An application user might prefer an application to show the UI elements so that more important features are more prominent. By contrast, in some applications, UI elements are ranked in a static manner by either the application designer, the application user, or both.

As used herein, a UI element can include a tab, menu, menu item, icon, text, and tool tip text. In some embodiments, selecting (e.g., clicked on with a keyboard, mouse, touchpad or other pointing device) a UI element causes an action or function to be performed. The action could include opening a window or dialog box, opening a webpage, performing an edit, sharing or emailing a file or image, etc. As used herein, "UI element" can also refer to the functionality associated with a UI element, such as a Photo Book, Photo Calendar, Photo Collage, Online Gallery, Slideshow, Flipbook, etc.

A method of ranking UI elements in a dynamic manner is disclosed. Unlike ranking UI elements in a static manner, when ranking UI elements in a dynamic manner, a set of rules is obtained to determine the ranking for a given user context, where the context could include one or more of the locale of the user, the time and date, age of the user, statistics associated with the user and/or other users, etc.

For example, for a digital photo application (e.g., Adobe® Photoshop® Elements), a rule may include selectively displaying and highly ranking a "creating Christmas card" UI element when the application is used during the Christmas season, and not displaying the "creating Christmas card" UI element otherwise. In contrast, in a static system, the application designer hard codes UI elements so that the same UI elements are always displayed.

In the example shown in FIG. 1A, a server 102 is coupled to one or more clients 104 through a network, such as a public or private network and/or combination thereof, for example the Internet, an Ethernet, serial/parallel bus, intranet, Local Area Network (LAN), Wide Area Network (WAN), or any other forms of connecting multiple systems and/or groups of systems together.

The set of rules may be provided by either the computer on which the application is run (client) or by a server computer (server). In various embodiments, the client could be one or more of a portable device, laptop computer, mobile telephone, personal digital assistant (PDA), digital music player (e.g., MP3 player), etc. In some embodiments, an application associated with the UI elements is installed locally on client 104, e.g., the application is a desktop application. In some embodiments, an application associated with the UI elements is stalled remotely on server 102, e.g., the application is a web application. In some embodiments, the application itself keeps generating or modifying rules based on user actions, for example showing the most frequently used UI element or last used UI element most prominently.

In some embodiments, server 102 determines a ranking of UI elements for an application user on client 104 based on a set of rules, and provides the ranking, stored in a file, to the application on client 104. In some embodiments, the server 102 provides a set of rules to the application on client 104, whereby the application determines the ranking on client 104. In some embodiments, if there is an update to the rules, the server 102 provides a subset of rules that have changed (differential set of rules) to client 104 to conserve resources between server 102 and client 104. In various embodiments, the rules, ranking, and/or differential set of rules is provided by a plugin, or any other appropriate means for transferring information. In some embodiments a plugin has the intelligence to compute the ranking. In some embodiments, rules are transferred by a file, a plugin, or other modes of transferring information including: Hypertext Transfer Protocol (HTTP), File Transfer Protocol (FTP), Representational State Transfer (REST), Extensible Markup Language (XML), Hypertext Markup Language (HTML), and JavaScript Object Notation (JSON).

Figure 1B:
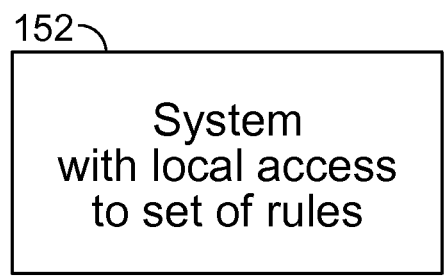
FIG. 1B is a block diagram illustrating an embodiment of a system for ranking UI elements in a dynamic manner in which rules are provided locally.

FIG. 1B is a block diagram illustrating an embodiment of a system for ranking UI elements in a dynamic manner in which rules are provided locally. In the example shown, device 152 does not require coupling with a server for selectively displaying and ranking the UI elements. Device 152 has local access to a set of rules and can generate a ranking of UI elements based on the rules. An application associated with the UI elements may be installed locally on device 152 or remotely, e.g., on a server. In some embodiments, device 152 connects to a server or other computers through a network to update the application or obtain other information.

Figure 2A:
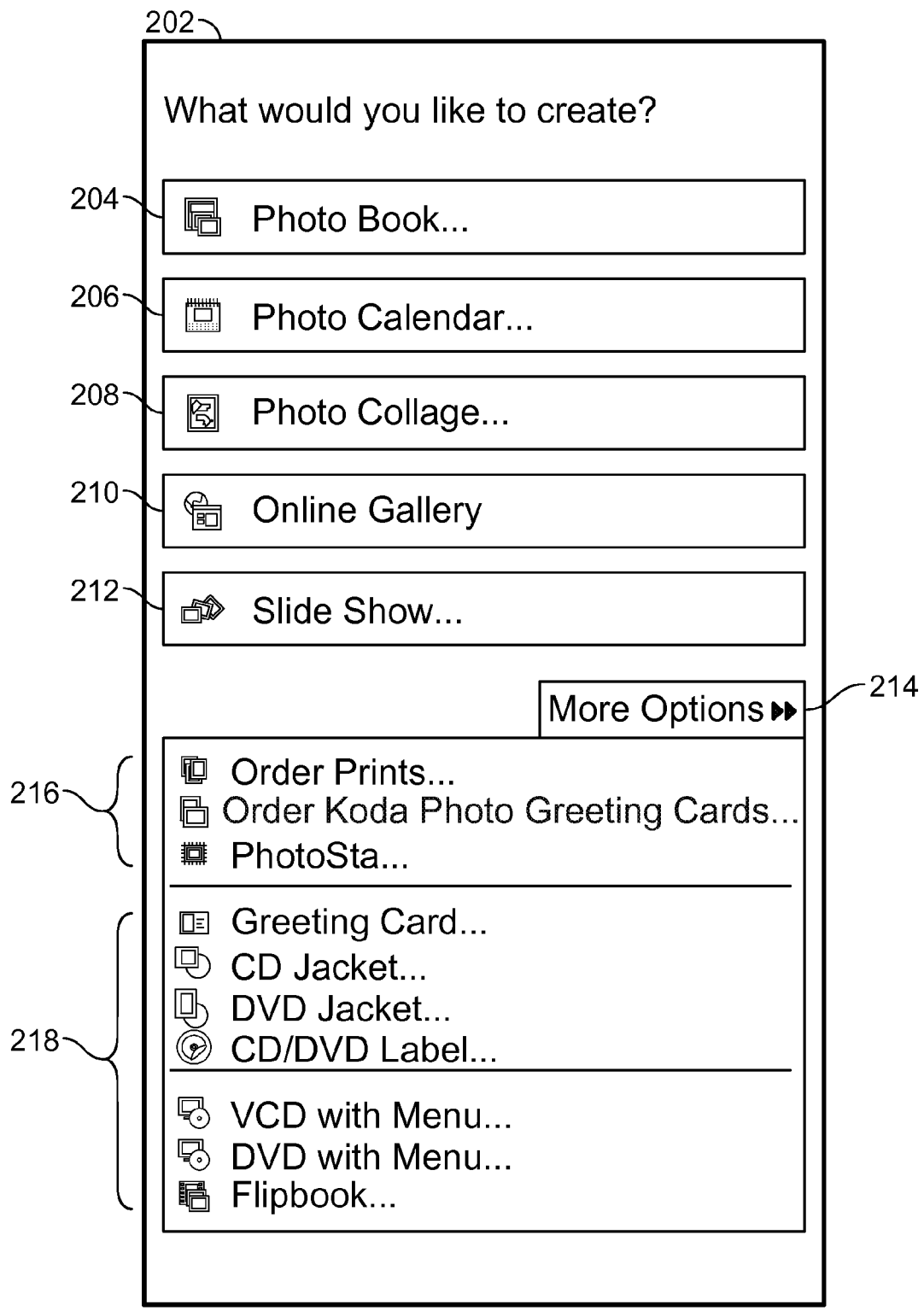
FIG. 2A is an illustration of UI elements within an application for a first user.

FIG. 2A is an illustration of UI elements within an application for a first user. In the example shown, UI element pane 202 belongs to a digital photo application, and contains buttons 204-214 for the first user or user account located in the United States of America ("US.") Buttons are an example of a UI element. In some embodiments, the higher the ranking of a UI element, the closer the UI element is to the top of a UI element pane. In the example shown, the ranking of the UI elements from top to bottom is:
1. Photo Book button 204;
2. Photo Calendar button 206;
3. Photo Collage button 208;
4. Online Gallery button 210;
5. Slide Show button 212; and
6. More Options button 214.

Any UI elements in the More Options button 214 are partially obscured to a user. In some embodiments, less important UI elements are associated with the More Options button 214. By activating More Options button 214, an additional menu shows: menu items subset 216 including options to order prints, order third party photo greeting cards or items; and menu items subset 218 including options to create greeting cards, optical disc jackets/labels/layouts/menus, and flipbooks.

Figure 2B:
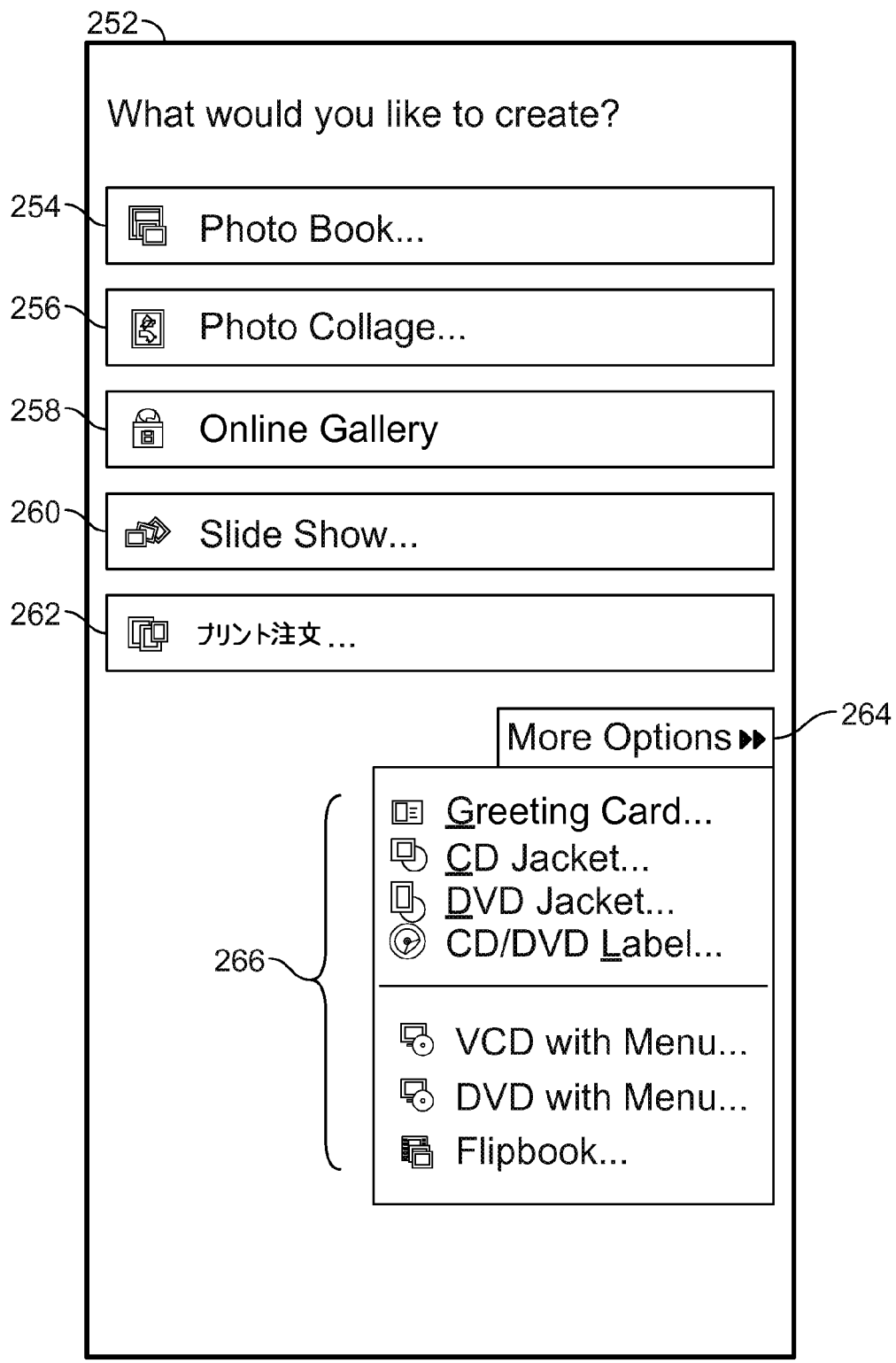
FIG. 2B is an illustration of UI elements within an application for a second user.

FIG. 2B is an illustration of UI elements within an application for a second user. In the example shown, UI element pane 252 belongs to a digital photo application, and contains buttons 254-264 for the second user or user account, located in Japan in this example.

In the example shown, the ranking of the UI elements from top to bottom is:
1. Photo Book button 254;
2. Photo Collage button 256;
3. Online Gallery button 258;
4. Slide Show button 260;
5. A Japanese button to locally order prints 262; and
6. More Options button 264.

By activating the More Options button 264, an additional menu shows: menu items subset 266 including options to create greeting cards, optical disc jackets/labels/layouts/menus, and flipbooks.

In comparing FIG. 2A and FIG. 2B, the same application ranking UI elements in a dynamic manner gives a different ranking for the US user than it does for the Japanese user. In this example, the application recognizes the different context for the US user and the Japanese user and ranks the UI elements differently within the UI element pane. In particular:
1. Both the US user and Japanese user have the Photo Book UI element 204 and 254 as the highest or top ranking;
2. The US user has an additional Photo Calendar UI element 206 applicable only in the US and ranked next;
3. Both the US user and Japanese user have the Photo Collage UI element 208 and 256, Online Gallery UI element 210 and 258, and Slide Show UI element 212 and 260, ranked next;
4. The Japanese user has an additional Japanese button to locally order prints 262, ranked next;
5. The US user has an additional menu items subset 216 under the More Options button 214 to locally order prints or greeting cards, ranked next;
6. Both the US user and Japanese user have the additional menu items subset 218 and 266 ranked at the bottom.

Figure 3A:
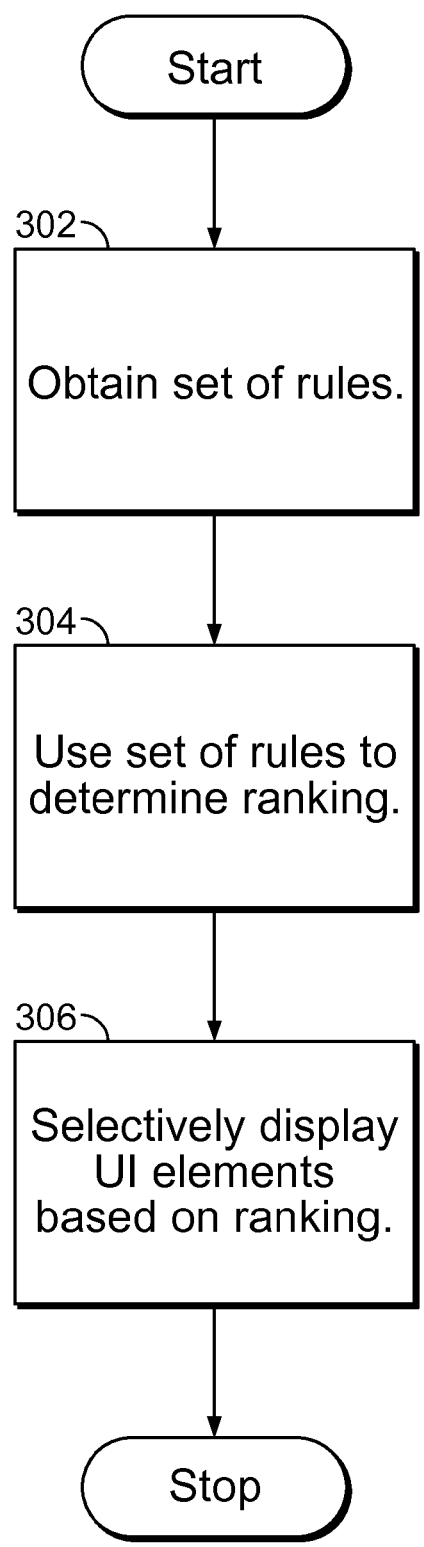
FIG. 3A is a flowchart illustrating an embodiment of a process to rank UI elements in a dynamic manner.

FIG. 3A is a flowchart illustrating an embodiment of a process to rank UI elements in a dynamic manner. The process may be implemented by server 102, between server 102 and client 104, and/or by device 152.

At step 302, an application obtains a set of rules. In some embodiments the set of rules is stored on server 102, client 104, or device 152. In some embodiments the set of rules is stored in memory or in a file.

FIG. 3B is an example of a set of rules for a digital photo application. In some embodiments, the set of rules have parameters. Rank parameters include the UI element the rule applies to, and one or more of a geographic location, date, time of year, season, marketing information ("context parameters"). Rank parameters also include an accuracy metric ("accuracy") and/or a weight metric ("weight").

A variety of context and rank parameters may be used in various embodiments. Other examples of parameters include usage information, such as popularity (among a group of users or a particular user). For example, if the popularity is over 75%, give it a weight of 10. The popularity may be determined based on server statistics, such as the number of times that UI element has been selected.

Another example is how recently a UI element has been used. For example, the more recently used, the higher the weight it is given. Other example parameters include age of the user or other user profile information, tagging information, etc. Rules and parameters can be added by an administrator and/or customized by the user. Rules and parameters can be added manually or automatically. For example, based on usage statistics, new rules may be automatically added to the list and existing rules could be edited.

Accuracy is a metric that indicates on how accurately the rule applies to demographics or other marketing information. In some embodiments accuracy is a percentage between 0% and 100%, inclusive. For the example of the digital photo application, the rule author believes that 80% of users would find the Greeting Card UI element useful at all locations for all age ranges of users, between December 15 and January 5 of every year. The rule author may have, for example, obtained this statistic based on marketing research.

Weight is a relative metric that indicates how important the rule is with respect to the selective display and ranking of the UI element. Weights do not require an upper or lower bound. In some embodiments, weight is an integer between −10 and 10, inclusive, and the greater the weight the higher the relative ranking. In some embodiments, a rule with negative weight indicates that its corresponding UI element should not be displayed. For the example of the digital photo application, to always hide a US Only Print Service UI element in Japan, the rule author assigned a weight of −10 to the corresponding rule. For example, a new feature that marketing would like to promote may be given a higher weight.

At step 304, the set of rules is used to determine a ranking. In some embodiments, dynamic parameters are used to determine the ranking.

In contrast to rank parameters, dynamic parameters are dynamically calculated. One dynamic parameter is a current context metric ("current context"), a metric calculated based on whether the application, the machine it is running on, and the application user currently satisfy all the corresponding context parameters. In some embodiments current context is a Boolean value of 0 or 1.

For the example of the digital photo application, if the application is running on Apr. 30, 2007, the machine is located in the US, and the user is sixteen years old, then the current context of the rules shown would be 0 for the Christmas, Chinese New Year in Korea, and Hide Print Service in Japan rules, and 1 for the Graduation and New Marketing Service rule.

Another dynamic parameter is a rule weight metric ("rule weight"). In some embodiments, a rule weight is a value used to determine which UI elements to display and/or a ranking of UI elements. In some embodiments, the rule weight is a metric calculated by multiplying other parameters to select which UI elements are to be displayed, and to determine a ranking for the UI elements to be displayed. For example, the rule weight is calculated as follows:

$$\text{rule weight} = \text{accuracy} \times \text{weight} \times \text{current context}$$

In some embodiments, a positive rule weight indicates that the corresponding UI element should be displayed (if its rule weight is high enough), and a zero or negative rule weight indicates that the UI element should be hidden (or not displayed). In some embodiments, a higher rule weight indicates that the corresponding UI element should be displayed more prominently (e.g., higher or larger in size than other UI elements) in the UI element pane.

For the example of the digital photo application, if the application is running on Apr. 30, 2007, the machine is located in the US, and the user is sixteen years old, then the rule weight of the rules shown would be 0 for the Christmas, Chinese New Year in Korea, and Hide Print Service in Japan rules. The rule weight of the Graduation rule would be 80, and the rule weight of the New Marketing Service rule would be 800.

In some embodiments, a particular UI element may correspond to multiple rules. For example, in the rules table of FIG. 3B, the Christmas rule and the Chinese New Year in Korea rule both correspond to a Greeting Card UI element. In this case, the rule weights are summed to determine a net weight and that net weight is used to determine the ranking for the Greeting Card UI element.

Figures 3C, 3D:
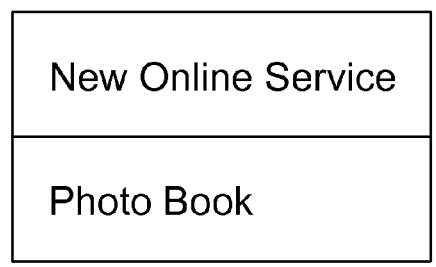
FIG. 3C shows an example of a net weight computation and a rank determined by sorting the net weights.
FIG. 3D shows an example of a ranking based on net weights.

FIG. 3C shows an example of a net weight computation and a rank determined by sorting the net weights. FIG. 3C shows the example of the digital photo application, if the application is running on Apr. 30, 2007, the machine is located in the US, and the user is sixteen years old. In this example, the rule weight would be 0 for the Christmas rule and 0 for the Chinese New Year in Korea rules, such that the Greeting Card UI element is the sum of both, 0+0, or 0. After summing multiple rules for each UI element to determine a net weight and that net weight, the ranking is given for each positive net weight from greatest weight to smallest weight.

FIG. 3D shows an example of a ranking based on net weights. FIG. 3D shows the example of the digital photo application, if the application is running on Apr. 30, 2007, the machine is located in the US, and the user is sixteen years old. In this example, the ranking of the New Online Service UI element corresponding to the New Marketing Service rule is therefore first and the ranking of the Photo Book UI element corresponding to the Graduation rule is second within the UI element pane. The Greeting Card UI element and US Only Print Service UI element would not be displayed in the UI element pane. A tie (i.e., two or more net weights being equal) may be resolved in a variety of ways. For example, if two elements are tied, then the tying elements may be ranked alphabetically, e.g., "Photo Book" would be ranked above "Photo Stamps" if they both have rank=3.

In various embodiments, the current context and rule weight are recalculated at fixed or variable intervals and/or event triggered. As a result, the UI element pane may be reconfigured dynamically as the user runs the application. In some embodiments, the current context and rule weight is recalculated each time the user starts the application. In some embodiments, the current context and rule weight is recalculated when a server 102 downloads a revised set of rules or a differential set of rules to client 104.

In various embodiments, any of the rules may be overridden, either manually or automatically. For example, if Koda print service is planning a maintenance shut down from 2 am-3 am on a particular date, then a corresponding UI element may be given a rule weight of −1 during that time period. In some embodiments, an administrator can manually adjust the rule weight for the Koda print service rule, or this can be automatically performed (e.g., via a script). Alternatively, a particular user may decide that he never wants to use Koda print service, and can manually override having the Koda print service rule. For example, if according to the rules and the context for this user, a Koda print service button would appear as the top button, if the user desires to override this (e.g., the user wants to make the button appear lower, or not at all), a user interface may be provided for this purpose. In some embodiments, the user interface may cause the rule weight to be adjusted accordingly so that the button appears where the user desires (or does not appear).

At step 306, the application selectively displays the UI elements based on the ranking. The ranking may be used to display the UI elements in a variety of ways in various embodiments. In one example, the UI elements are displayed as follows: All UI elements that have a negative net weight are not displayed. Of the remaining UI elements, the five with the highest net weight are displayed vertically from top to bottom, ordered based on their net weights (e.g., buttons 204-212 in FIG. 2A). The remaining UI elements are displayed when a More Options button is selected (e.g., menu items 216 or 218 in FIG. 2A). The menu items may be ordered based on the net weights or other criteria (e.g., alphabetically) in various embodiments. Depending on the implementation, step 306 may be performed by a server, client, and/or device.

Other examples of ways in which the ranking can be used to display the UI elements include: displaying the UI elements in different orders from left to right, from top to bottom, diagonally, etc.; displaying UI elements in varying sizes (e.g., the higher the rank, the larger the button); and/or using different UI elements for different rankings (e.g., buttons for the 3 highest ranked UI elements, menu items for the next 10 highest ranked UI elements, and don't display the rest of the UI elements).

Figure 4:
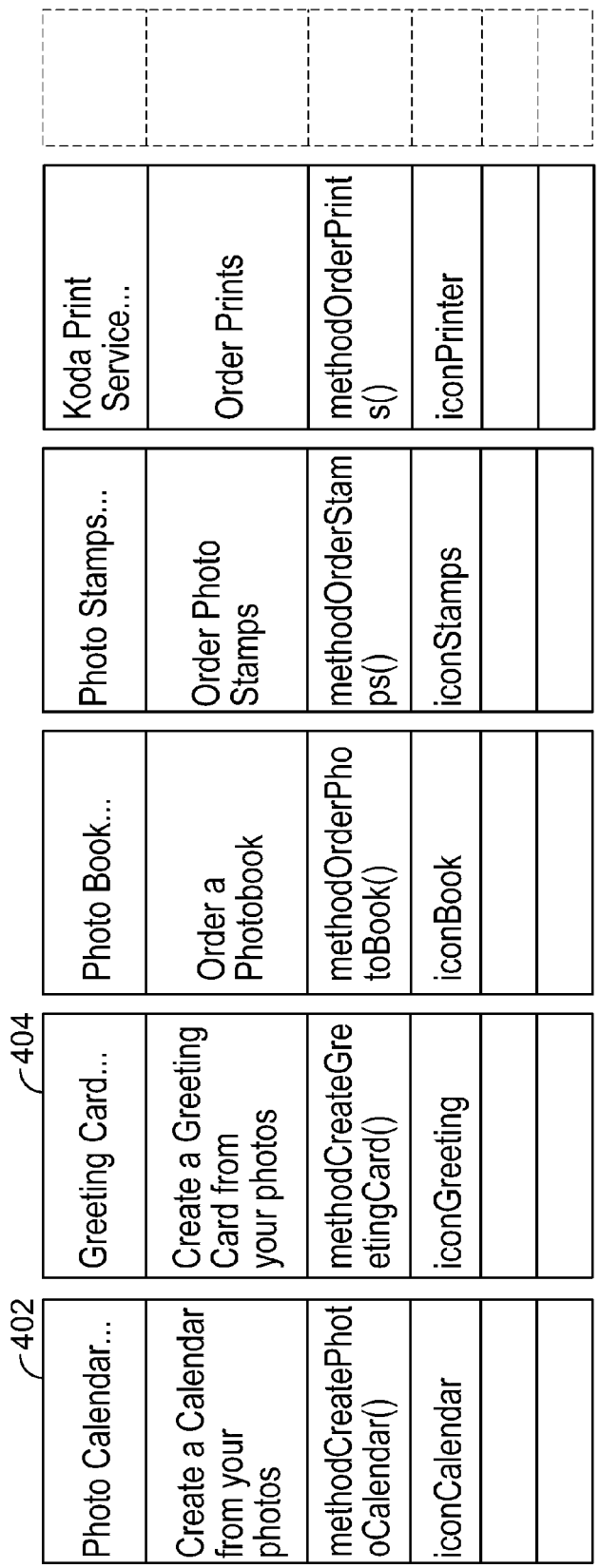
FIG. 4 is an illustration of an element list for UI elements.

FIG. 4 is an illustration of an element list for UI elements. In some embodiments UI elements correspond to a set of information including:

- the string ("title") to be shown on an UI element;
- the string ("tool tip") to be shown over a UI element when a computer user interface device such as a mouse or keyboard is placed over the UI element but without any mouse click or keyboard press ("hover");
- the method to call when a computer user interface device such as a mouse or keyboard activates the UI element with an action, such as a mouse click or keyboard press; and
- an icon associated with a UI element.

FIG. 4 illustrates some examples of UI elements for the digital photo application including Photo Calendar UI element 402, which has:

- title "Photo Calendar . . . ";
- tool tip "Create a Calendar from your photos";
- calls method "methodCreatePhotoCalendar( )" when activated; and
- has icon "iconCalendar" associated with it.

Similarly, Greeting Card UI element 404 has:

- title "Greeting Card . . . ";
- tool tip "Create a Greeting Card from your photos";
- calls method "methodCreateGreetingCard( )" when activated; and
- has icon "iconGreeting" associated with it.

In some embodiments, a structure to represent a UI element can be created, "CreationItem":

```
typedef void (CreatePane::*pt2Member)(void);
struct CreationItem
{
    pt2Member   callThisWhenClicked;
    QString     elementName;
    QString     elementToolTip;
    int         elementUniqueId;
    int         elementIconIndex;
};
```

A list of CreationItems are created:
typedef std::vector<CreationItem>CreationList;
CreationList mCreationList;

In some embodiments, at or after step 306, when the selective displaying and ranking of UI elements have been determined, the CreationList is filled, ignoring any UI elements of negative rank:

CreationItem cItem;
cItem.elementName="Photo Book . . . ";
cItem.elementIconIndex=PtPixmaps::eCreatePhoto-Book_Md;
cItem.callThisWhenClicked=CreatePane::slotNewEditorPhotoBookFile;
cItem.elementUniqueId=ePhotoBook;
cItem.toolTip="Create and print a photo book";
mCreationList.push_back(cItem);

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer implemented method comprising:
   determining a current context for a particular user using an application having a plurality of user interface elements, wherein the current context is based in part on a current locale of the particular user, a current attribute of the particular user, a current time, or a current date, the current context automatically and dynamically determined by the computer while the particular user uses the application;
   ranking the user interface elements based on the current context; and
   displaying one or more of the plurality of user interface elements based at least in part on the ranking of user interface elements.

2. A method as recited in claim 1, wherein displaying comprises selecting the one or more user elements to display from the plurality of user interface elements based at least in part on the current context.

3. A method as recited in claim 1, wherein displaying comprises selecting an order in which to display the one or more user interface element(s) based at least in part on the current context.

4. A method as recited in claim 1, wherein the current context further comprises the actions of the particular user with respect to the application.

5. A method as recited in claim 1, wherein the current context further comprises the actions of a plurality of users with respect to the application.

6. A method as recited in claim 4, wherein the current context further comprises which user interface elements are used by the particular user.

7. A method as recited in claim 5, wherein the current context further comprises which user interface elements are used by a plurality of users.

8. A method as recited in claim 1, wherein displaying comprises obtaining a set of rules, wherein each rule reflects how useful a particular user interface element is to a particular current context.

9. A method as recited in claim 8, wherein displaying comprises using the set of rules and the current context to determine a rule weight for each of the plurality of user interface elements and displaying the one or more user interface elements is based at least in part on the rule weight of each of the user interface elements.

10. A method as recited in claim 9, wherein the rule weight depends at least in part on the frequency of use of the user interface element by the particular user or by a plurality of users.

11. A method as recited in claim 9, wherein the rule weight depends at least in part on how recently the user interface element was used by the particular user.

12. A method as recited in claim 8, wherein the set of rules includes displaying a most recently used user interface element or a most frequently used user interface element in a more prominent location.

13. A method as recited in claim 8, wherein the set of rules is user configurable.

14. A method as recited in claim 8, wherein the set of rules may be modified automatically.

15. A method as recited in claim 14, wherein the set of rules may be modified automatically based on the usage statistics.

16. A computer program product, the computer program product being embodied in a non-transient computer readable medium and comprising computer instructions for:
   determining a current context for a particular user using an application having a plurality of user interface elements, wherein the current context is based in part on a current locale of the particular user, a current attribute of the particular user, a current time, or a current date, the current context automatically and dynamically determined by the computer while the particular user uses the application;

ranking the user interface elements based on the current context; and displaying one or more of the plurality of user interface elements based at least in part on the the ranking of user interface elements.

17. A computer program product as recited in claim 16, wherein displaying comprises selecting the one or more user elements to display from the plurality of user interface elements based at least in part on the current context.

18. A computer program product as recited in claim 16, wherein displaying comprises selecting an order in which to display the one or more user interface element(s) based at least in part on the current context.

19. A computer program product as recited in claim 16, wherein the current context further comprises the actions of the particular user with respect to the application.

20. A computer program product as recited in claim 16, wherein the current context further comprises the actions of a plurality of users with respect to the application.

21. A computer program product as recited in claim 16, wherein displaying comprises obtaining a set of rules, wherein each rule reflects how useful a particular user interface element is to a particular current context.

22. A system comprising:
a processor; and
a memory coupled with the processor, wherein the memory is configured to provide the processor with instructions which when executed cause the processor to:

determine a current context for a particular user using an application having a plurality of user interface elements, wherein the current context is based in part on a current locale of the particular user, a current attribute of the particular user, a current time, or a current date, the current context automatically determined by the computer while the particular user uses the application;

rank the user interface elements based on the current context; and display one or more of the plurality of user interface elements based at least in part on the ranking of user interface elements.

23. A system as recited in claim 22, wherein display comprises selecting the one or more user elements to display from the plurality of user interface elements based at least in part on the current context.

24. A system as recited in claim 22, wherein display comprises selecting an order in which to display the one or more user interface element(s) based at least in part on the current context.

25. A system as recited in claim 22, wherein the current context further comprises the actions of the particular user with respect to the application.

26. A system as recited in claim 22, wherein the current context further comprises the actions of a plurality of users with respect to the application.

27. A system as recited in claim 22, wherein display comprises obtaining a set of rules, wherein each rule reflects how useful a particular user interface element is to a particular current context.

* * * * *